United States Patent [19]

Keller

[11] Patent Number: 4,504,867

[45] Date of Patent: Mar. 12, 1985

[54] RADIATION CONTAINMENT APPARATUS AND METHOD

[76] Inventor: John D. Keller, 7324 Southwest Fwy., Ste. 800, Houston, Tex. 77074

[21] Appl. No.: 449,488

[22] Filed: Dec. 13, 1982

[51] Int. Cl.³ ......................... H04N 5/65; H04N 5/72

[52] U.S. Cl. .................................... 358/247; 358/245; 358/252

[58] Field of Search ............... 358/245, 247, 252, 253, 358/255, 254

[56] References Cited

U.S. PATENT DOCUMENTS

| | | | |
|---|---|---|---|
| 2,503,813 | 4/1950 | Fisch | 358/245 |
| 2,734,142 | 2/1956 | Barnes | 358/247 |
| 3,329,770 | 7/1967 | Rose | 358/245 |
| 3,610,994 | 10/1971 | Sheldon | 358/245 |

*Primary Examiner*—Howard W. Britton
*Assistant Examiner*—Victor R. Kostak
*Attorney, Agent, or Firm*—Dula, Shields & Egbert

[57] ABSTRACT

A radiation containment apparatus comprising a source of radiation having an area from which radiation is emitted, and a vinyl polymer sheet generally arranged about the area from which radiation is emitted in a manner so as to receive the radiation. The source of radiation is a cathode ray tube. The vinyl polymer sheet is a clear sheet of polyvinyl chloride. An enclosure made up of polyvinyl chloride sheets generally surround the source of radiation. A plurality of fasteners are arranged about the periphery of the cathode ray tube so as to receive the polyvinyl chloride sheet. The polyvinyl chloride sheet also includes notches about the outer edges for engaging the fasteners on the cathode ray tube.

15 Claims, 3 Drawing Figures

RADIATION CONTAINMENT APPARATUS AND METHOD

TECHNICAL FIELD

The present invention relates to apparatus and methods for the prevention of radiation exposure. More particularly, the present invention relates to polyvinyl chloride sheets as preventing exposure to ionizing radiation from a cathode ray tube.

BACKGROUND ART

Cathode ray tubes are used widely in present technology. Cathode ray tubes (CRT) are used in television sets, word processing terminals, computer terminals, video games, and a variety of other applications. In all of these applications, the cathode ray tube is used to produce an image on a fluorescent screen.

A cathode ray tube consists of an evacuated glass container with a fluorescent screen at one end and a focused electron gun and deflection system at the other. When the electron beam emerges from the electron gun, it passes through pairs of metal plates mounted in such a way that they deflect the beam horizontally and vertically to produce a luminous pattern on the screen. The screen image is a visual representation of the voltages applied to the deflection plates. In addition to the screen image, the cathode ray tube also produces X-ray radiation that is emitted outwardly from the screen and outwardly from the body of the cathode ray tube. The amount of X-ray radiation produced from the cathode ray tube will vary in relation to the voltage in the power supply. In other words, color cathode ray tubes will produce a higher level of X-ray emission than will black-and-white cathode ray tubes.

In earlier days, it was believed that the amount of X-ray radiation produced by the cathode ray tube was relatively harmless to human beings. This was based on the fact that people were generally far removed from the cathode ray tube in its most common usage, i.e., as part of a television set. The diffusion of the X-rays over a distance greater than five feet generally exposes the viewer to minimal X-ray radiation. Also, in earlier days, cathode ray tubes did not have widespread application as word processing machines, computer terminals, or as video games.

Today, however, there is considerable evidence that the X-rays generated by a cathode ray tube present a considerable danger to human health. There is strong evidence that suggests that the emissions of cathode ray tubes can cause birth defects, premature births, and other genetic abnormalities. This is a relatively recent phenomenon. The main reason for this problem is the fact that users of the cathode ray tube are no longer far removed from the radiation source. Secretaries using word processing terminals remain seated in close proximity to the cathode ray tube for eight hours a day, and generally five days a week. Over time, this amounts to a very high level of exposure to the X-ray emissions. Moreover, users of video games can sometimes remain implanted in front of screens for equally long lengths of time. The chances of excessive exposure to radiation is magnified by the fact that video games are usually color cathode ray tubes. There are also many other occupations which require constant viewing of cathode ray tube screens. There has been very little effort to develop devices which prevent the radiation emission from cathode ray tubes. Heretofore, the need to develop such a radiation prevention device was thought unnecessary. Also, the technology was relatively unavailable for coupling radiation prevention with the clear viewing of the cathode ray tube screen.

The only device thought practical for preventing X-ray emission from cathode ray tubes was a clear lead (Pb) screen. Such a screen could be placed in front of a cathode ray tube and would effectively prevent any X-ray emission from traveling beyond the surface of the lead screen. Unfortunately, such clear lead screens are very impractical both from an economical standpoint and from a viewing standpoint. The cost of such screens is in the neighborhood of $1,500 for a sheet the size of a television screen. Also, the clear lead sheet will generally degrade the resolution of the image quality produced by the cathode ray tube. Thus, clear lead screens have not had wide application as a means of preventing the X-ray emission from cathode ray tubes.

There are a number of devices on the market today which place a screen between the cathode ray tube and the viewer. However, these screens have not been effective in preventing X-ray emission. These screens have only been used for reducing glare, preventing dust accumulation, and preventing damage to the screen. Generally, these screens are made of acrylic or other plastic that allow X-rays to pass easily therethrough. Thus, present devices which are affixed between the cathode ray tube and the viewer have been ineffective in preventing X-ray emission upon the viewer.

Polyvinyl chloride is also known in the prior art. Vinyl is the name for the univalent radical of $CH_2{=}CH{-}$, which is further described by its termination products as $CH_2{=}CHR$ and $CH_2{=}CHX$, e.g., vinyl benzene and vinyl chloride. The divalent radical $CH_2{=}2$ is referred to as vinylidene. The various monomers that contain these structures are readily polymerized or copolymerized through their carbon double bonds. Vinyl polymers are comprised of a relatively select group, which includes polyvinyl chloride, polyvinyl acetate, polyvinyl alcohol, polyvinylidene chloride, their copolymers and related products. Polyvinyl chloride (PVC) is the exception to the limited use trend of the vinyl polymers. PVC compounds possess such dynamic versatility that they compete effectively with most thermoplastics for market applications and for available feed stocks. However, polyvinyl chloride has not had application as a radiation emission prevention device for use in combination with cathode ray tube screens.

It is an object of the present invention to provide a method and apparatus for preventing X-ray radiation emission upon the viewer of a cathode ray tube.

It is another object of the present invention to provide a radiation containment method and apparatus which is easy to manufacture and economically accessible.

It is a further object of the present invention to provide a method and apparatus that contains the X-rays emitted by the cathode ray tube while still maintaining the resolution and image quality of the cathode ray tube.

These and other features and advantages of the present invention will become apparent from reading of the attached Specification and appended Claims.

DISCLOSURE OF INVENTION

The present invention is a method of reducing radiation emission from a cathode ray tube comprising the steps of aligning a sheet of vinyl polymer in proximity to and in correspondence with the screen of a cathode ray tube. The sheet of vinyl polymer comprises a clear sheet of polyvinyl chloride. The method further includes the steps of affixing the sheet of polyvinyl chloride to the screen of the cathode ray tube. The method further includes the step of enclosing the cathode ray tube with polyvinyl chloride so as to form a structure about the cathode ray tube.

The present invention is also a radiation containment apparatus comprising a radiation emission source having an area from which radiation is emitted, and a vinyl polymer sheet generally positioned about the area from which the radiation is emitted so as to receive the radiation. This vinyl polymer sheet is a sheet of clear polyvinyl chloride. The radiation emission source is a cathode ray tube. The apparatus further includes a structure of polyvinyl chloride material generally surrounding the source of radiation emission. The apparatus further includes an attachment device for removably affixing the polyvinyl chloride sheet to the cathode ray tube. This attachment device may be complementary Velcro TM strips or it may be a plurality of fasteners arranged about the periphery of the cathode ray tube. The polyvinyl chloride sheet includes notches about the periphery for engaging the fasteners on the cathode ray tube. The cathode ray tube is of the type used in word processing units, television sets, computer terminals, and video games.

BEST MODE FOR CARRYING OUT THE INVENTION

Figure 1:
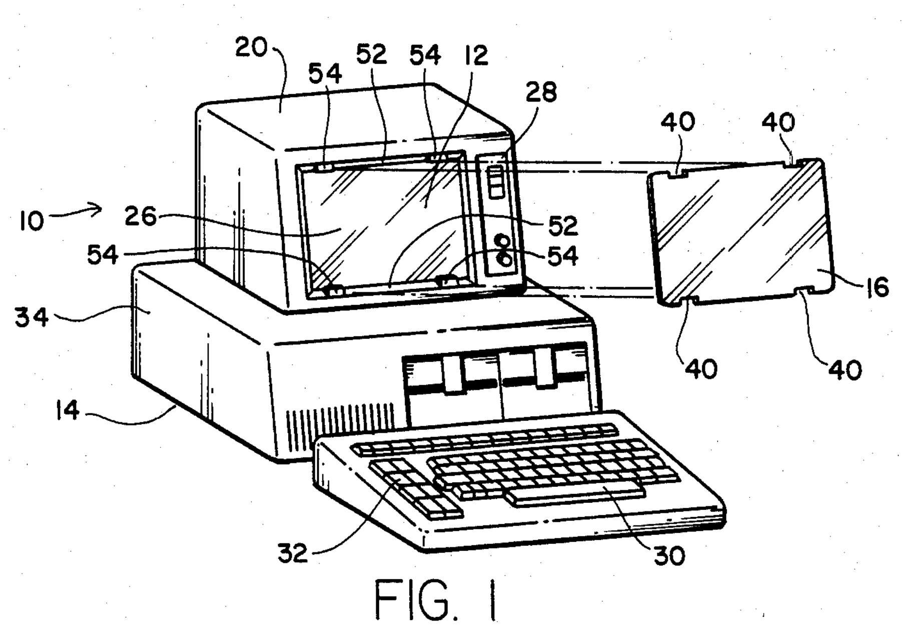
FIG. 1 is an exploded view of the polyvinyl chloride sheet and a word processing terminal.

The present invention is shown generally at 10 in FIG. 1. FIG. 1 shows the combination of the cathode ray tube 2, a word processing terminal 14, and a polyvinyl chloride sheet 16. The combination of these elements forms the basis of the present invention.

A source of ionizing radiation, such as cathode ray tube (CRT) 12, is appropriately positioned within the enclosure 20. Enclosure 20 is made of a vinyl polymer material such as polyvinyl chloride. The cathode ray tube 12 has an electron gun portion 22 at the end within enclosure 20. A frustoconical section 24 extend outwardly from electron gun portion 22. Frustoconical section 24 includes the electronic elements which deflect the electro beam so as to produce an image on screen 26. Screen 26 forms the other end of cathode ray tube 12 opposite electron gun portion 22. Screen 26 extends generally outwardly from enclosure 20. In combination with the electron gun and the deflection plates, screen 26 serves to produce a screen image as a visual representation of the voltages applied to the deflection plates within the cathode ray tube 12. In operation, cathode ray tube 12 produces X-ray radiation and emits that radiation from screen 26 and throughout the body of the CRT. A control panel 28 is in electrical connection with cathode ray tube 12. Control panel 28 provides the on/off function, contrast function, resolution function, and various other functions for the CRT. Control panels 28 are common among virtually all varieties of cathode ray tubes 12.

Word processing terminal 14 is electrically connected with cathode ray tube 12. Word processing terminal 14 includes a keyboard 30, controls 32, and casing 34. Casing 34 contains the necessary electronics for relaying a message from keyboard 30 onto the screen 26 of cathode ray tube 12. In this manner, a visual representation is presented on screen 26 upon the depressing of the keys on keyboard 30 of the word processing terminal 14.

Although word processing terminal 14 is illustrated in FIG. 1, this is not meant as a limitation on the present invention. The present invention if equally applicable to all mechanisms which utilize a cathode ray tube. The types of mechanisms which utilize such cathode ray tubes are too lengthy to even be recited herein. Some of the more common mechanisms utilizing cathode ray tubes include: television sets, video game units, computer terminals, oscilloscopes, radar and sonar instruments, and many, many others.

Figure 2:
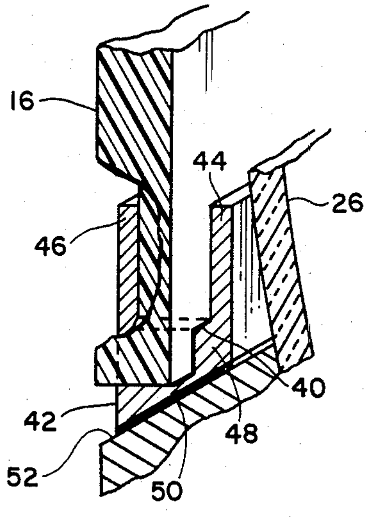
FIG. 2 is a closeup perspective view of the arrangement for fastening the polyvinyl chloride sheet to the cathode ray tube.

Polyvinyl chloride screen 16 is generally a flat, clear sheet of a size corresponding to the size of screen 26 of cathode ray tube 12. As seen in FIG. 1, polyvinyl chloride screen 16 is generally rectangular but for four notches 40 occurring along the periphery of screen 16. Notches 40 are received by fasteners 42, as seen in FIG. 2. Fasteners 42 have a pair of parallel side members 44 and 46. A connection portion 48 serves to connect parallel side members 44 and 46. A piece of double-sided epoxy tape 50 is attached to the bottom of connection section 48. The distance between parallel side members 44 and 46 should be sufficient so as to slidably engage the faces of polyvinyl chloride screen 16.

As used in connection with the arrangement of FIG. 1, epoxy tape 50 fastens to angled surface 52 about the enclosure 20 of cathode ray tube 12. This epoxy tape 50 will maintain fasteners 42 in their proper positions about the cathode ray tube 12. Side member 44 is generally placed adjacent screen 26 of cathode ray tube 12.

Figure 3:
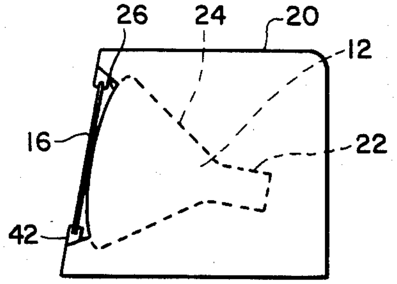
FIG. 3 is a side view of the sheet as positioned about the CRT.

Fasteners 42 are placed about the periphery of screen 26 at four locations 54. The fasteners are positioned about the screen 26 and the polyvinyl chloride screen 16 is then fitted therein. Connection section 48 serves to matingly receive notches 40 on screen 16. In this manner, the polyvinyl chloride screen 16 is maintained in its proper position in relation to the cathode ray tube 12, as shown in FIG. 3.

It should be noted that the above stated method of attaching the polyvinyl chloride screen 16 about cathode ray 12 can be varied considerably. An alternative method would be to fasten mating Velcro TM strips at locations 54 about screen 26 and about the corresponding locations on the periphery of polyvinyl chloride screen 16. In this manner, screen 16 may be removably fastened about the exterior of cathode ray tube 12. This allows both the cathode ray tube 12 and the polyvinyl chloride screen 16 to be removed for cleaning and repair. The method of attaching screen 16 to cathode ray tube 12 is not intended as limitation on the present invention, but merely as a way of illustrating the preferred embodiment.

In operation, the combination of the polyvinyl chloride screen 16 with cathode ray tube 12 serves to effectively prevent X-ray radiation from being emitted upon the viewer of the screen 26. Without the polyvinyl chloride screen 16, the cathode ray tube 12 emits large doses of X-ray radiation outwardly toward the viewer of the screen. Typically, where the viewer is in close proximity to the screen of the cathode ray tube, the viewer will become highly exposed to this X-ray radiation. This radiation can be particularly harmful to eyesight, genetic balance, and reproductive organs. The amount of radiation emitted will be a function of the proximity of the viewer to the screen, the voltage applied to the cathode ray tube, and the type of cathode ray tube employed in this system. By interposing a polyvinyl chloride screen 16 between the cathode ray tube 12 and the viewer, the X-ray radiation emission of the cathode ray tube is effectively blocked.

Radiation emission from the body of cathode ray tube 12 may be effectively contained by making the enclosure 20 from a polyvinyl chloride material. The polyvinyl chloride material employed as the enclosure 20 would not have to be clear. It could be made of any available color. Also, the polyvinyl chloride material may be formed or positioned about the enclosure 20 in a generally layered arrangement with the original enclosure material.

The polyvinyl chloride in screen 16 is from a family of vinyl polymers. Until recently, polyvinyl chloride has not been available in clear form. As a result, it has had no application as a protective cover for cathode ray tube screens. In clear form, polyvinyl chloride screen 16 serves the useful function of blocking radiation emission from the cathode ray tube 12 while preserving the resolution and clarity of the image formed on screen 12. Due to the thermal sensitivity of polyvinyl chloride, as manifested through dehydrochlorination, oxidation, chain scission, and cross-linking, stabilizers are a necessity to polyvinyl chloride compounds. Stabilizers are available as a wide variety of chemicals and combinations, designed and customized for all the various uses of PVC. They are usually inorganic, metal organic, or organometallic compounds whose nomenclatures reflect the metal cations, e.g., lead, barium-cadmium, calcium-zinc, and tin stabilizers, or organic compounds classified by chemical species, e.g., nitrogenous and epoxy stabilizers. Normally, the inorganics, metal organics, and organometallics are primary stabilizers while the organic materials are secondary, or auxiliary stabilizers. In the particular application of the present invention, it is desirable that the stabilizers within the polyvinyl chloride be of the inorganic, metal organic, or organometallic compounds whose nomenclatures reflect the cations. Thus, the stabilizes within the PVC will comprise lead, cadmium, barium, or other radiation blocking elements. It is in this manner that the polyvinyl chloride sheet 16 effectively blocks the radiation from the cathode ray tube 12.

Experiments were conducted using various materials for determining the effectiveness of the materials in attenuating low-energy X-ray beams similar to those produced by video display terminals (VDTs). Measurements were made on a Profexray Jupiter 325 X-ray unit having a tungsten target and a beryllium window and was manufactured by Litton Medical Systems. The dosimeter system was an X-ray Monitor (model 1015) manufactured by MDH Industries. The chamber was set at 130 cm from the anode and the attenuating materials were placed at approximately 30 cm from the anode. The first and second half value layers (hvl) in millimeters (mm) of aluminum were determined for different energy beams ranging from 26 kVp to 35 kVp. This was estimated to be the maximum operating voltage in a VDT. The homogeneity factor (i.e. the first HVL divided by the second HVL) was then determined. The closer this value is to unity, the closer the X-ray beam is to being monoenergetic. Certain types of X-ray attenuating material were then placed in the beam and the percent X-ray transmission was determined. The beam parameters and results of these measurements are listed in Table 1 below.

TABLE 1

A list of the percent transmission of X-rays through pieces of PVC 1/16" and 3/16" thick for the stated beam energies. For all the measurements, 300 milliamperes and 2 seconds were used in the exposures.

| kVp | Filt* | HVL* | H.F.+ | PVC (1/16") | PVC (3/16") |
|---|---|---|---|---|---|
| 26 | 0 | 0.86 | 0.87 | 46.6% | 13.6% |
| 26 | 1 | 1.06 | — | 52.2% | 18.4% |
| 30 | 0 | 0.90 | 0.75 | 52.7% | 18.6% |
| 30 | 1 | 1.20 | — | 59.4% | 22.1% |
| 35 | 0 | 1.02 | 0.74 | — | — |
| 35 | 1 | 1.50 | — | 61.7% | 26.9% |

*mm of Al
+Homogeneity factor

For all energies measured, the lead embedded plastic manufactured by Nuclear Associates attenuated the beam by more than 99% and therefore, were not included in the table. Two sheets of polyvinyl chloride (PVC) were also good attenuators, considering their thickness. The 3/16" PVC attenuated 73% of the 35 kVp beam hardened with 1 mm of aluminum.

In this manner, polyvinyl chloride may be used to prevent genetic damage, birth defects, and other health hazards associated with the radiation emitted by cathode ray tubes. It is also desirable, in combination with screen 16, to make the cathode ray tube enclosure 20 from a colored polyvinyl chloride material. In this manner, radiation is contained within the cathode ray tube enclosure. Also, radiation is prevented from being emitted around the periphery of the cathode ray tube.

Since polyvinyl chloride is a relatively common compound, the fabrication of each of the elements of the above invention is relatively inexpensive. The screen 16 can be shaped from generally larger, inexpensive sheets of polyvinyl chloride. Such a screen can be shaped to generally correspond to the size of the screen 26 of cathode ray tube 12. Also, since polyvinyl chloride sheets come in a number of tints and colors, the screen can be designed so as to be glare resistant. Glare-resistant screens can serve to prevent eyestrain by viewers of the cathode ray tube. Additionally, a plate of polyvinyl chloride can be manufactured so as to fit underneath the cathode ray tube apparatus. This plate can be positioned so as to be interposed between the reproductive organs of the viewer and the cathode ray tube. This would provide additional protection from radiation emission about the periphery of the screen. It is also believed that polyvinyl chloride can be used in a variety of other configurations in combination with the cathode ray tube so as to prevent radiation emission therefrom.

The apparatus and method of the present invention serves to effectively prevent a very large portion of the X-ray radiation emitted from the cathode ray tube from reaching the viewer of the screen. Additionally, the present method and apparatus provides an inexpensive and cost effective means of preventing this radiation from reaching the viewer. There is no loss of resolution or clarity of the image on the screen through the use of the clear polyvinyl chloride. These and other advantages should be achievable with the present invention.

The foregoing disclosure and description of the invention is illustrative and explanatory thereof, and various changes in the method steps, as well as in the details of the illustrated apparatus, may be made within the scope of the appended claim, without departing from the true spirit of the invention.

I claim:

1. A method of reducing radiation emission from a cathode ray tube comprising:

positioning a sheet of a transparent polyvinyl chloride material in proximity to and in correspondence with the screen of said cathode ray tube; and affixing said sheet in position exterior of said screen.

2. The method of claim 1, said polyvinyl chloride sheet being of the type imbedded integrally with lead.

3. The method of claim 1, further including the step of:

enclosing said cathode ray tube with polyvinyl chloride, said polyvinyl chloride forming a structural arrangement distal from said cathode ray tube.

4. The method of claim 1, further including the step of:

shaping said sheet to a size generally larger than the size of said screen of said cathode ray tube, said sheet being of a size generally overlapping the outer periphery of said cathode ray tube.

5. A radiation containment apparatus comprising:

a radiation generation means having an area from which radiation is emitted; and a clear polyvinyl chloride material affixed exterior of said area from which said radiation is emitted so as to receive said radiation.

6. The apparatus of claim 5, said radiation generation means being a cathode ray tube.

7. The apparatus of claim 5, said polyvinyl chloride material having stabilizers of high atomic number imbedded integrally therein.

8. The apparatus of claim 5, further including attachments for removably affixing said clear polyvinyl chloride material to said radiation generation means.

9. The apparatus of claim 8, said attachment means being Velcro TM strips.

10. The apparatus of claim 8, said attachment means being a plurality of fasteners arranged about the periphery of said radiation generation means, said fasteners receiving said clear polyvinyl chloride material.

11. The apparatus of claim 10, said clear polyvinyl chloride material including notches about the periphery, said notches engaging said fasteners so as to retain said sheet in its position about said area of said radiation generation means.

12. The apparatus of claim 5, said polyvinyl chloride material being of the generally glare resistant variety.

13. The apparatus of claim 5, further comprising:

a polyvinyl chloride structure generally surrounding and distal from said radiation generation means.

14. A method of reducing radiation exposure to the viewer of a source of radiation comprising:

forming a structure of polyvinyl chloride so as to surround said source of radiation; and interposing said structure between said viewer and said source of radiation.

15. The method of claim 14, said source of radiation being a cathode ray tube, said structure having one portion generally forming a cabinet around said cathode ray tube and another portion being of clear polyvinyl chloride and forming a screen adjacent the imaging area of said cathode ray tube.

* * * * *